No. 889,988. PATENTED JUNE 9, 1908.
C. R. THOMPSON.
FILTERING APPARATUS.
APPLICATION FILED MAR. 30, 1907.
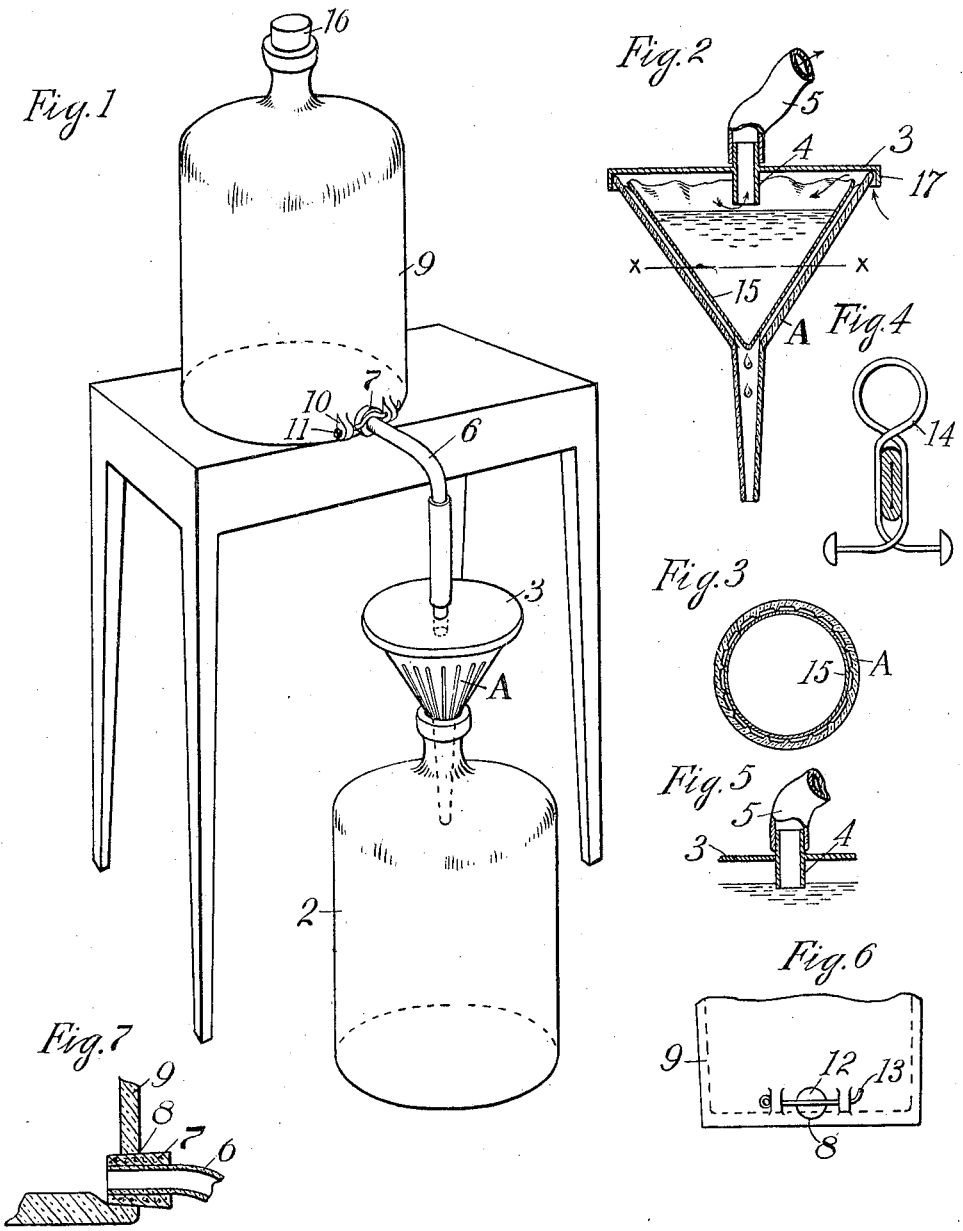
Witnesses,
George Voelker
Hattie Smith
Inventor,
Clarence R. Thompson
by Lothrop Johnson
his Attorneys.

UNITED STATES PATENT OFFICE.

CLARENCE R. THOMPSON, OF MINNEAPOLIS, MINNESOTA.

FILTERING APPARATUS.

No. 889,988.   Specification of Letters Patent.   Patented June 9, 1908.

Application filed March 30, 1907. Serial No. 365,511.

*To all whom it may concern:*

Be it known that I, CLARENCE R. THOMPSON, a citizen of the United States, residing at Minneapolis, in the county of Hennepin and State of Minnesota, have invented certain new and useful Improvements in Filtering Apparatus, of which the following is a specification.

My invention relates to improvements in filtering apparatus, its object being to provide an improved form of filter which will automatically regulate the flow of liquid from the discharging nozzle and which will prevent evaporation during the process of filtering.

To this end my invention consists in the features of construction and combination hereinafter particularly described and claimed.

In the accompanying drawings forming part of this specification, Figure 1 is a perspective view of my apparatus; Fig. 2 is a vertical longitudinal section of the filter; Fig. 3 is a section on line $x$—$x$ of Fig. 2; Fig. 4 is a section through a tubing connection showing a device for closing the tubing; Fig. 5 is a sectional end view of the tube leading into the filter; Fig. 6 is a view of the lower end of the retainer from which the liquid is discharged to the filter, and Fig. 7 is a sectional view through the discharge opening of the receptacle.

In the drawings A represents a filtering funnel of ordinary construction and adapted in use to be inserted into the mouth of a suitable receiving vessel 2. In carrying out my invention I provide a funnel with a removable cover 3 having an outer flange 17 fitting over the edge of the funnel. Through the center of the cover 3 extends a tube 4 the lower end of the tube 4 opening into the funnel some distance below the cover. Fitted over the upper end of the tube 4 is a rubber tubing 5, said tubing being fitted at its opposite end over a bent glass tube 6 which in turn passes through a stopper 7 fitted in the discharge opening 8 of the retainer 9. The retainer 9 is preferably formed upon the opposite sides of the opening 8 with ears 10 formed with openings 11 through which may be passed a wire to hold the stopper 7 in position.

In Fig. 6 I show the retainer closed by a solid cork 12 held in position by wire 13 extending through the ears 10. A suitable clip 14 may be employed to compress the rubber tubing 5 and hold it closed, when desired.

In use the parts will be arranged as shown in Fig. 1 with a sheet of filtering paper 15 arranged within the funnel and with the neck of the retainer 9 closed by a cork 16. The liquid from the retainer 9 will pass through the glass tube 6 and rubber tubing 5 into the filter, air passing from the filter through said tubing and tube to replace the displaced liquid in the retainer. As the liquid rises in the filter to cover and seal the lower end of the tube 4 air will be stopped from passing from the filter to the retainer and will shut off the flow of liquid to the funnel until the liquid will again drop below the lower end of the tube 4. The cover 3 fits loosely enough upon the funnel to allow the necessary air to pass around the cover into the top of the funnel. It will thus be evident that the liquid within the funnel will be maintained at substantially the level of the lower end of the tube 4 as indicated in Fig. 5, leaving a space between the liquid and the top of the funnel at all times, preventing overflowing of the funnel. The further result is that the liquid will be always filling the major portion of the funnel thus getting the maximum amount of filtering surface and expediting the filtering operation. The glass tube 6 serves to indicate the passage of liquid to the filter and of air from the filter to the retainer thus obviating the necessity of lifting the cover 3. By means of my construction I am able to arrange the apparatus as shown in Fig. 1 and leave it unattended without fearing overflow of the filter or evaporation of the liquid. With the ordinary constructions of filter it is impossible to satisfactorily handle liquids containing alcohol or other easily evaporating constituents on account of the large amount of evaporation of said constituents taking place. Such evaporation is practically eliminated in my construction. Thus it will be evident that the particular form of cover and the other details of construction may be more or less modified without departing from the idea of my invention, the scope of which is defined in the claims.

I claim—

1. A filtering apparatus comprising in combination a funnel containing filtering material, a removable cover therefor extending over the outer edge of said funnel and an inlet conduit through said cover the discharge end of said conduit being lower than the upper edge of said funnel.

2. A filtering apparatus comprising in combination a funnel containing filtering material, a removable cover therefor extending over the outer edge of the funnel, a receptacle, a tube connecting said receptacle and funnel, the end of said tube extending through said cover to a point below the upper edge of said funnel.

In testimony whereof I affix my signature in presence of two witnesses.

CLARENCE R. THOMPSON.

Witnesses:
ARTHUR P. LOTHROP,
H. S. JOHNSON.